N. W. PERKINS, Jr.
ELECTRIC DRIVE FOR CALCULATING MACHINES.
APPLICATION FILED JULY 7, 1911.
1,136,165.
Patented Apr. 20, 1915.
5 SHEETS—SHEET 1.
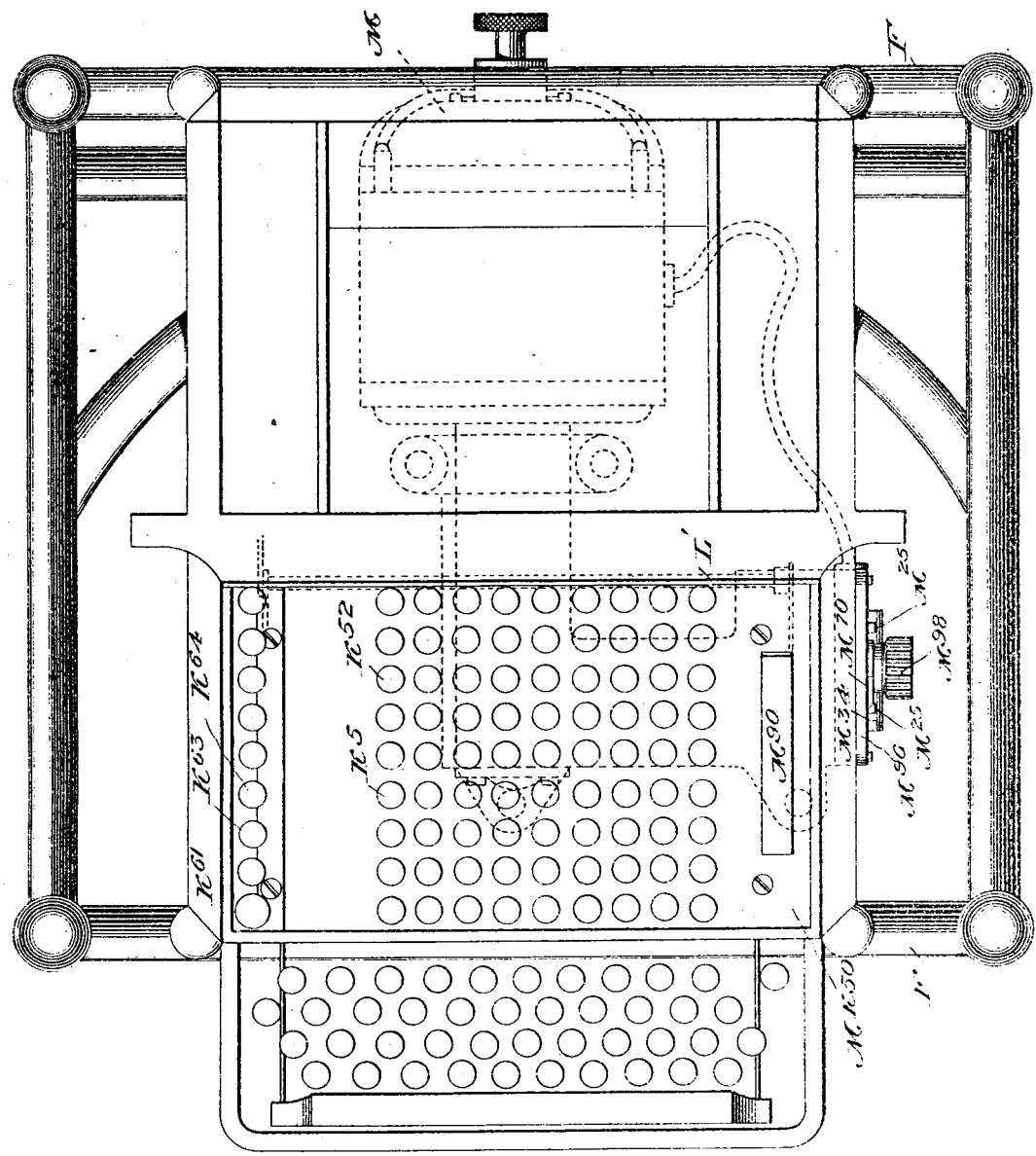

N. W. PERKINS, Jr.
ELECTRIC DRIVE FOR CALCULATING MACHINES.
APPLICATION FILED JULY 7, 1911.
1,136,165.
Patented Apr. 20, 1915.
5 SHEETS—SHEET 2.
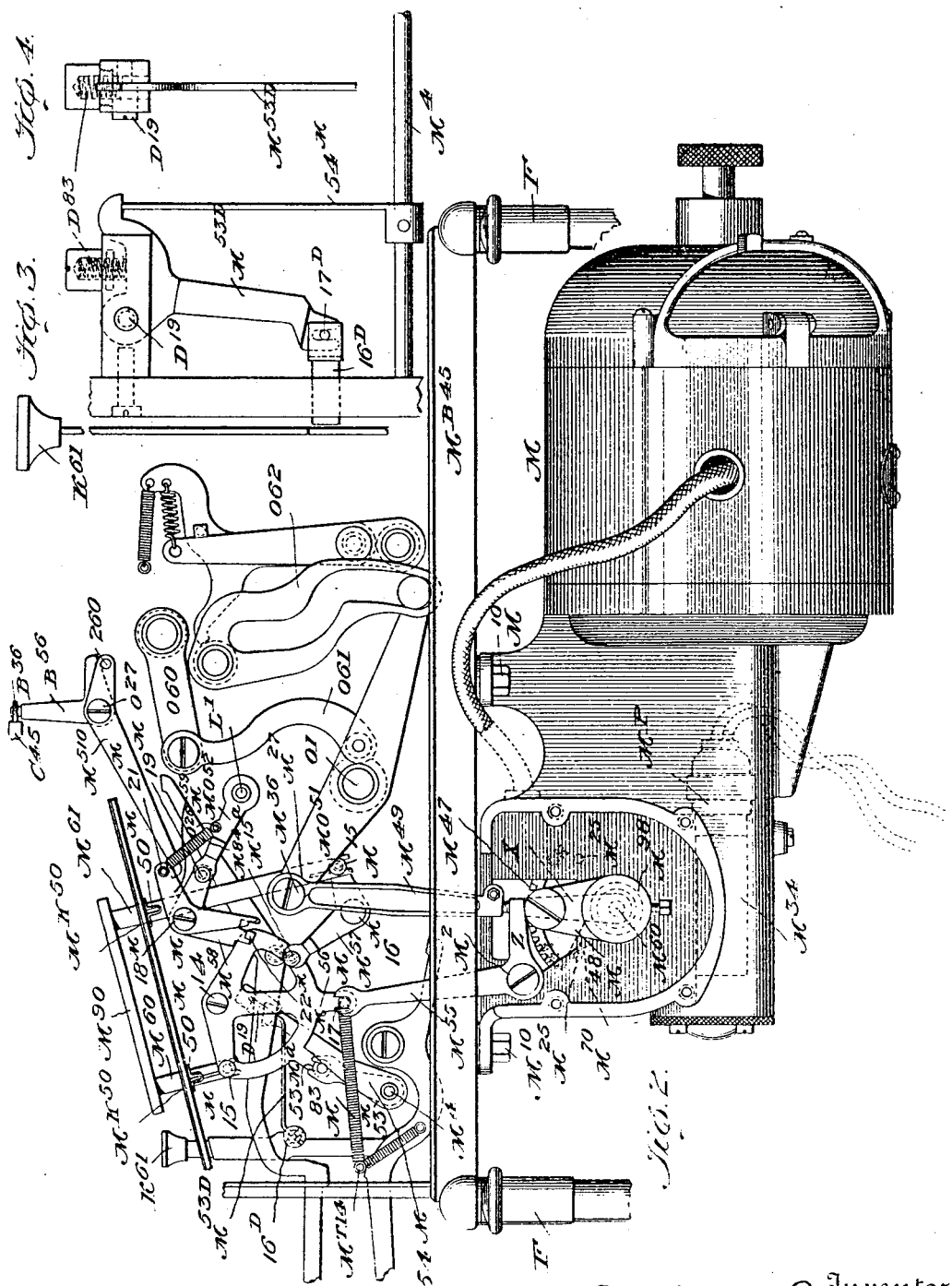

N. W. PERKINS, Jr.
ELECTRIC DRIVE FOR CALCULATING MACHINES.
APPLICATION FILED JULY 7, 1911.
1,136,165.　　　　　　　　　Patented Apr. 20, 1915.
6 SHEETS—SHEET 3.
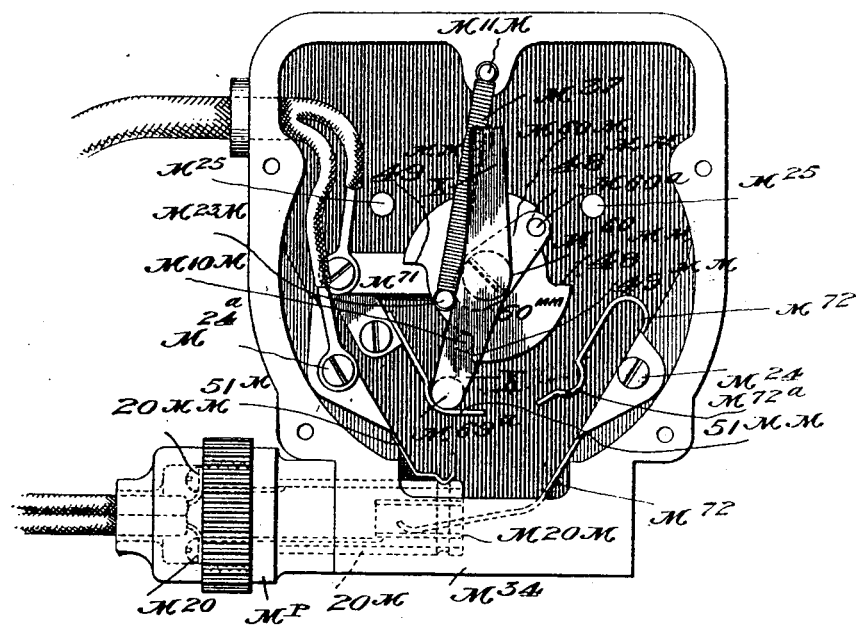
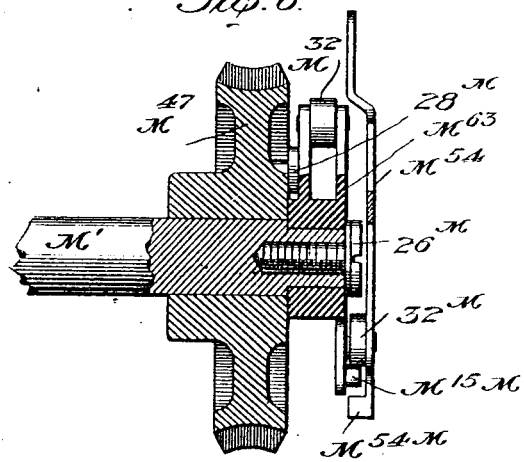

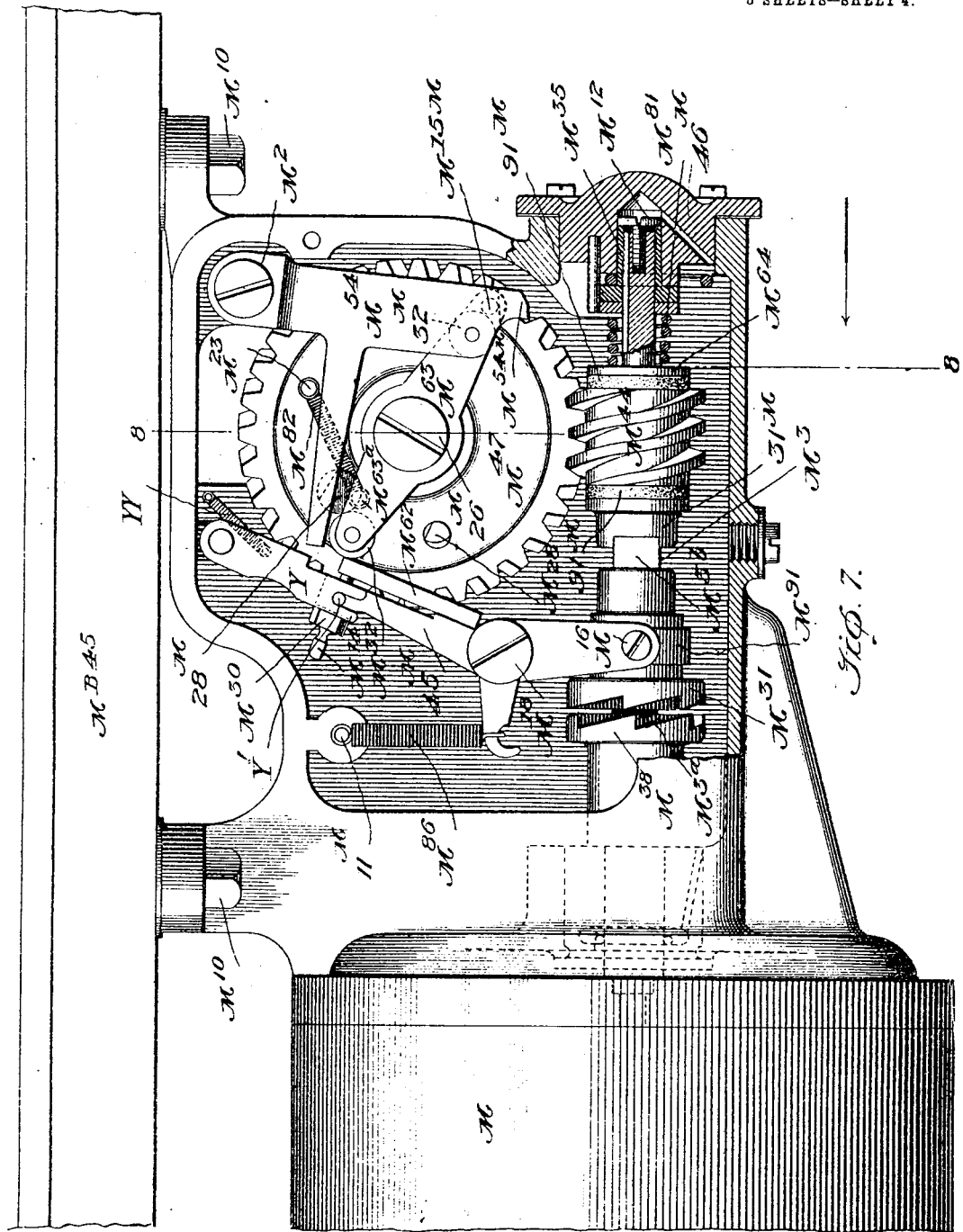

N. W. PERKINS, Jr.
ELECTRIC DRIVE FOR CALCULATING MACHINES.
APPLICATION FILED JULY 7, 1911.
1,136,165.
Patented Apr. 20, 1915.
5 SHEETS—SHEET 5.
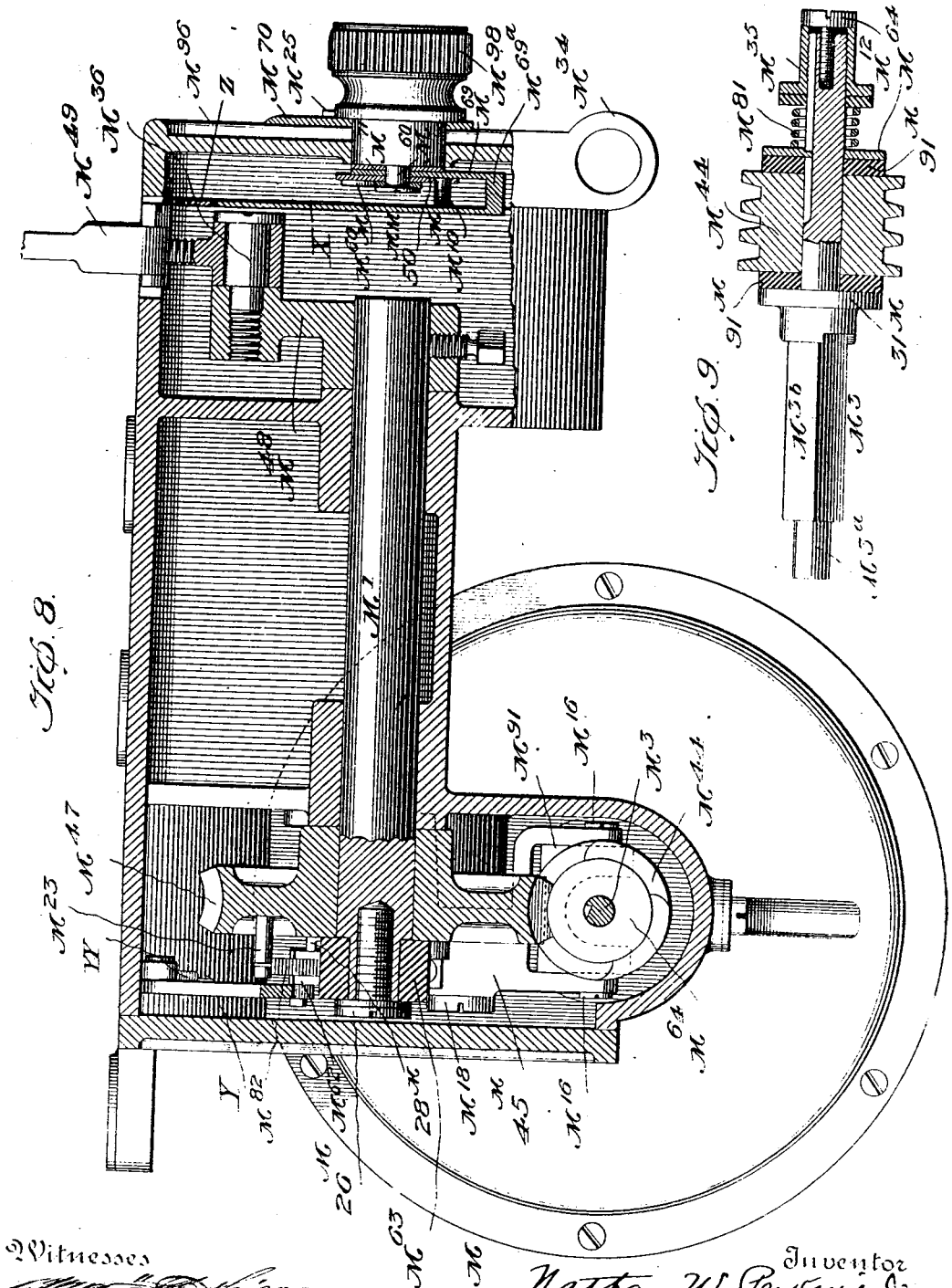

UNITED STATES PATENT OFFICE.

NATHAN W. PERKINS, JR., OF EAST ORANGE, NEW JERSEY

ELECTRIC DRIVE FOR CALCULATING-MACHINES.

1,136,165.  Specification of Letters Patent.  Patented Apr. 20, 1915.

Application filed July 7, 1911. Serial No. 637,375.

*To all whom it may concern:*

Be it known that I, NATHAN W. PERKINS, Jr., a citizen of the United States, residing at East Orange, county of Essex, and State of New Jersey, have invented certain new and useful Improvements in Electric Drives for Calculating-Machines, of which the following is a specification.

This invention relates to drive-controlling means for calculating machines.

One object of the invention is to provide novel automatically operating means which will, on manual operation of a starting bar or member, cause the clutch controlling the driving of the calculating machine from the motor to be thrown into operation and automatically released on one revolution of the drive shaft which operates the calculating machine and thereby automatically reset the parts for subsequent operations.

The invention has for a further object the provision of novel means for locking the starting bar, or member when the motor is not in operation; new means for locking the starting bar or member unless an operating key of the calculating machine is depressed or the carriage of the calculating machine is in tabulating position; the provision of novel means for locking the starting bar or member so that the machine may not be driven by the motor when the carriage has passed beyond the predetermined printing position of the printing mechanism of the calculating machine.

The invention has for another object the provision of new means, in a motor driven calculating machine having a correction key and a starting or controlling bar or member which will coöperate with said correction key and starting bar or member to prevent the depression of one when the other is depressed or operated.

A further object of the invention is the provision of lock-out means in a motor drive for calculating machines by which, once the starting bar or member has been manually operated, the motor drive will perform its cycle of operation without possibility of interruption through accident or design.

The foregoing statement of the objects of the invention is to be deemed explanatory, rather than restrictive, of the scope of the invention, and so, also, the following detailed description is not to be considered as excluding modifications of structure within the spirit and scope of the invention.

In the accompanying drawings: Figure 1 is a plan, showing so much of a calculating machine and its supporting frame as will indicate the position and adoption of the present invention thereto, the latter being shown mainly in dotted lines, but with the switch and starting bar in full lines; Fig. 2, a detail side elevation of the invention and certain parts of the calculating machine with which it is associated, the cover for the crank box being removed; Figs. 3 and 4, details of a part of the interlocking device for the starting mechanism and correction key; Fig. 5, an inner face view of the switch when in "off" position; Fig. 6, a detail section through the worm gear and the latch; Fig. 7, a detail of the driving mechanism, partly in section, the cover plate being removed and the parts shown in normal position; Fig. 8, a section on line 8—8, Fig. 7; and Fig. 9, a detail, partly in section, of the driven shaft and frictionally driven pinion carried thereby.

The motor drive may be suitably positioned in reference to the calculating machine, but preferably is fastened to the bottom plate MB45 thereof by bolts M10, whereby the electric motor M and the casing for the clutch, levers, trip and gears, as well as other parts, are suspended from the bottom of the calculating machine, enabling the entire mechanism constituting the drive, to be applied to or removed from the machine; which, in turn may be supported by any suitable frame F.

Suitably secured to the spindle of the motor armature is the clutch member M38. Loosely mounted in the clutch member M38 is the cylindrical end $M3^a$ of the spindle M3 which is journaled at its outer end in a removable cap 46M and has a squared portion $M3^b$. Engaged with the squared part $M3^b$ is a metal washer or collar 31M. Loose on the spindle M3, but feathered thereto, is another washer or collar M64. Loose on the spindle M3 is a worm M44 at the opposite ends of which are leather washers or friction clutches 91M which engage by friction with the ends of said worm and with the collars or washers 31M and M64, whereby the worm M44 is driven solely through such frictional engagement from the shaft M3. To hold the worm in the proper frictional contact with the washers or clutches 91M, I provide a coil spring M81, which encircles the spindle M3 and whose tension may be adjusted by the screw sleeve M35 which is locked by the screw M12. In consequence of this construction, should the resistance encountered by the worm M44 in driving the worm gear M47, with which it is in mesh, become too great, the worm M44 will remain stationary while the spindle M3 turns within it, and in consequence of this friction safety gearing, it is impossible for any breakage to occur within the operative parts of the calculating machine due to any failure thereof to properly perform their respective functions, it being understood that the gear M47 is secured to the shaft M1 which operates the calculating machine, as will more fully appear hereinafter. This friction gear furthermore gives slightly upon the sudden clutching of the motor shaft and thereby starts the calculating machine gently and without jar.

Slidable upon the polygonal portion M3$^b$ is a clutch M31 adapted to engage the clutch M38 of the motor armature spindle. When such engagement occurs, the spindle M3 is driven by the motor spindle or shaft, but at other times the spindle M3 remains stationary. Pivoted on a screw stud M18 is a lever 45M which has a bifurcated lower end connected by screw pins M16 with a block M91 which has parts disposed in an annular groove of the clutch M31 so that the clutch M31 is free to revolve at all times.

The spring M86, engaged with an ear on the lever 45M and connected to a pin 11M on the frame, tends to throw the clutches M31 and M38 into engagement, but the engagement of these clutches is normally prevented. Secured to the upper part of the lever 45M is a wear plate or shoe M62, against whose free end bears an adjusting screw M14 having a clamping nut M30 and screw threaded through the upper end of the lever M45, by which a certain minute adjustment of the shoe may be had to compensate for wear and to insure the correct positioning of the parts, as will now appear.

Loosely mounted on the end of the shaft M1 and secured by a screw 26M, is the arm M63 which is provided with a roll M32 at one end adapted to bear against the shoe M62. The other end of the arm M63 is provided with a pin M15M. A spring M82 connected to the arm M63 at M63$^a$ and to a pin M23 on the worm gear M47, tends to draw the end of the arm M63 carrying the roll M32 upwardly, but when the parts are in their normal position, the roll M32 rests against the shoe M62 at its extreme end and this spring is under tension. The gear M47 carries two pins or studs M28 and 28M, sufficiently spaced apart to permit of a limited relative movement of the arm M63 and the gear M47. Secured to a shaft M2 which is rockably mounted, is a latch M54 which has a lug M54M adapted to normally lie underneath the pin M15M of the arm M63 to thereby hold the arm M63 in latched position, and in consequence, to maintain the clutch M31 out of engagement with the clutch M38. The latch M54 also carries a roller 32M which overlies the pin M15M when the parts are in normal position.

Before proceeding to a description of the starting bar and allied mechanisms, I here stated that when the starting bar is depressed, the latch M54 is swung to the right of Fig. 7, disengaging the lug M54M from the pin M15M, whereupon the spring M82 draws the upper end of the arm M63 upwardly out of engagement with the shoe M62. Should there be a sticking or hesitancy in the movement of the arm M63 the roll 32M will strike the pin M15M and positively cause such disengagement of the arm M63 with the shoe M62, causing instant release of the lever 45M and instant engagement of the clutches M31 and M38, in consequence of which the worm M44 is revolved and the gear M47 turned thereby, and through the shaft M1, the calculating machine is driven. When the gear M47 has nearly made a complete revolution the roll M32 on the arm M63 will contact with the lower part of the shoe M62 and the spring M82 will be extended until the pin M28 in the gear M47 contacts with the arm M63 forcing it upward and thereby rocking the arm 45M and disengaging the clutch M31 from the clutch M38, this being accomplished the spring M82 is strong enough to cause a further movement of the arm M63, and if the starting bar has been released after being depressed the pin M15M will engage the lug M54M of the arm M54 which will have swung back into position and the arm M63 will be arrested with the roll M32 in contact with the end of the shoe M62, but should the starting bar be held in its depressed position the pin M15M will contact with the roll 32M on the arm M54 and cause a small movement of the arm M54 to the left in passing, which movement will be communicated to the starting bar and so notify the operator that one revolution has been completed and another begun. The parts being in motion when the clutch M31 is disengaged from the clutch M38 and the resistance of the calculating machine being variable, the momentum of the parts will cause some continuation of motion after the clutches are disengaged and the gear M47 will not always stop in exactly the same position, but the variation is not enough to affect the operation of the calculating machine, and the action of the spring M82 will always bring the arm M63 to its normal position.

The starting bar M90 is carried by slides M60, M61 working in slots in the top MK50 of the calculating machine. The slides carry stops 50M to limit the upward movement of the starting bar. Pivoted on a screw or stud 14M is the rocker M56, one of whose arms is pivoted at 15M to the slide M60. Pivoted at 16M is another rocker M57 which is pivoted to the slide M61 at M15 and has its other leg bifurcated and slidably pivoted on a stud M15ª carried by the rocker M56. The arrangement of slides and rockers and levers above described constitutes an equalizing mechanism whereby pressure or a slight tap on any part of the starting bar M90 will be communicated to the rocker M56, and hence it makes no difference where the operator strikes the bar M90, as a movement of the rocker M56 will thereupon ensue and no binding or derangement of the parts is possible.

Secured to the shaft M2 which carries the latch M54 is a lever M55 which has a pivoted sliding connection with the rocker M56 at 17M so that upon depression of the starting bar M90 movement will be immediately communicated to the latch M54, insuring its instant release from the pin M15M to permit the driving mechanism to turn the shaft M1 a complete revolution and thereby operate, through a crank M48 and connecting rod M49 pivoted thereto on a wrist pin M36, the rocker MO51 mounted on the operating shaft O1 of the calculating machine, the connecting rod M49 and the rocker MO51 being pivoted together at M27. The parts O60, O61, O62, etc., are similar to corresponding parts of a calculating machine set forth in the application of Halcolm Ellis, Serial No. 470108, filed December 30, 1908, and are here shown as illustrating the adaptation of the electric drive to a calculating machine, but I wish it understood that the present invention is adaptable for use in connection with any calculating machine of the type set forth in the aforesaid application of Halcolm Ellis.

To keep the starting bar normally elevated and the latch M54 in normal engagement with the arm M63 there is provided a spring MS3 which connects to the frame of the machine at MT14 and to the stud or pivot 17M.

Carried by the rocker M56 is a square stud or pin 22M. Pivoted on a stud or screw 18M is an angular latch M58 whose end is shaped so that it may overhang and engage the square stud 22M to lock the rocker M56, and hence the starting bar M90, against movement, and it is maintained normally in this position by a lever MO52 which is secured to a shaft L1 and has a slidable pivotal connection 19M with the latch M58. The shaft L1 may be controlled by the operating or controlling keys of the calculating machine, or by the positioning of the carriage thereof, as shown in the application of Halcolm Ellis, Serial No. 470108, aforesaid, by which the latch M58 prevents the depression of the starting bar M90 except when one of the operating keys K63, K64, etc., is depressed or set or the carriage is in tabulating position, and thus it is impossible to depress the starting bar M90 on the mere depression of the ordinary numeral keys K5, K52, etc., of the machine during the setting up of the items on the key board, and as in the application of Halcolm Ellis aforesaid, the depression or operation of the correction key K61 will lock the starting bar against depression even though it has been unlocked by the depression of one of the operating keys or the tabulation of the carriage.

As with the calculating machine set forth in the aforesaid application of Halcolm Ellis, Serial No. 470108, so with the present invention, I employ a latch M59 pivoted on the pin 18M and whose lower end is shaped and adapted to be set over the stud 22M, but is normally prevented from engaging with said stud by the co-action with a pin 21M on the latch M59 of a lever M51O which is pivoted on a pin O27, the said lever being forced against the pin 21M by a trip B56 engaging with the pin 26O and provided with a roll B36 which normally is engaged by the carriage C45, but when the carriage passes beyond the printing position for the printing mechanism of the calculating machine, the roll B36 is disengaged from the carriage and the lever M51O is then released so that a spring M84 connected to the pin 21M and to a pin O26 on the lever MO52, causes the latch M59 to engage the square stud 22M and thus, when the carriage of the calculating machine has passed beyond the printing position, the latch M59 will lock the rocker M56 and the starting bar M90 and prevent any operation of the driving mechanism.

An interlock is provided between the correction key K61 and the starting bar K90 to prevent operation of either when the other is depressed. A sliding pin 16D is disposed so that it may be projected to engage with a notch or shoulder of the correction key K61 by a lever M53D which is pivoted at D19 and pressed by a spring D83, its connection with the pin 16D being a fork and pin 17D.

Running across the machine is a shaft M4 which carries a cam 54M adapted to normally engage the lever M53D and hold the pin 16D retracted out of engagement with the correction key K61. Secured to the shaft M4 is a lever 53M which has a sliding pivotal connection 53Mª with the rocker M56. Upon depression of the starting bar M90, the cam 54M will be swung out of engagement with the lever M53D and the spring D83 will thereupon instantly project the pin 16D into engagement with the shoulder of the correction key K61, locking it against depression, and if the correction key K61 be depressed the starting bar K90 is locked against depression as hereinbefore described.

In order to prevent the release of the starting bar once it has been depressed and before a nearly complete revolution of the gear M47 has occurred, there is provided a pivoted lock-out Y, actuated by a spring YY and provided with a bifurcated lower end straddling a pin Y' on the lever 45M. When the latch M54 is moved on the depression of the starting bar, the arm thereof drops, and as the lock-out Y has shifted, due to the release of the lever 45M, the shoulder of the lock-out Y overhangs the arm of the latch M54 and hence the release of the starting bar will not permit the latch M54 or the starting bar to resume their normal position until the gear M47 and arm M63 have nearly completed a revolution. When this occurs, the engagement of the roll M32 with the shoe M62, causes the lock-out Y to release the arm of the latch M54 which thereupon resumes its normal position just before the revolution is completed, and hence is ready to relatch the arm M63. The starting bar having been thus retained in its depressed position during the greater part of the revolution or double stroke of the calculating machine, the correction key K61 is locked during that time and cannot be manipulated.

I provide an interlock between the electric switch which controls the electric motor and the starting bar M90, rendering it impossible to depress the starting bar except when the switch is in the "on" position. The switch is disposed adjacent the lever M55 and the crank M48, the parts being carried by a cap or cover M96 of the insulating material provided at its bottom with a tubular socket M34 into which project the contact M72, secured by the screw M24 and the contact 51M secured by the screw M24ª, the latter contact being adapted to contact with the metal external sleeve 20M in circuit with the terminal 20M of the plug MP and the former with the internal metal sleeve M20M which is in circuit with the terminal M20 carried by the plug MP. The terminals of the plug may be connected to any suitable electric circuit, and the contact 51M is connected to one pole of the motor M. The other pole of the motor M is connected to a plate M71. Disposed adjacent and in contact with the plate M71 is a switch arm M69 which is adapted to engage with the part 51MM of the contact or terminal 51M when the switch is "off". Lying next the switch arm M69 is a plate 50MM having two sets of shoulders 48MM and 49MM. A pin M10M on the switch arm M69 is adapted to play between and to be engaged by either of the shoulders 49MM. A spring M37 connected to a pin M11M on the plate M96 and to a pin M23M on the plate 50MM, is so arranged that it will be disposed on one side or the other of the center of rotation of the plate 50MM and thereby, through the pin M10M, hold the switch arm M69 where positioned, and the provision of the shoulders 49MM insures a snap action in kicking the contact M69 in one direction or the other, tending to minimize sparking. The contact M72 is preferably provided with a free end M72ª against which the stud M69ª may strike when the switch arm is in the "on" position. Passing loosely through the plate M71, the switch arm M69, and the plate 50MM is a spindle M60 which is provided with an arm M60M having a pin M60ª adapted to play between and to engage the shoulders 48MM when turned by a knob M98 which carries a pointer M70 adapted to play between the pins M25 on the plate M96. On turning the knob in either direction, a snap action ensues in throwing the switch arm M69 into or out of engagement with the contact 51MM.

Secured to the arm M69 by means of the pins M10M and M69ª is an arm X which is disposed underneath and in engagement with an arm Z on the lever M55 when the pointer M70 is at the "off" position, and thus the lever M55, the rocker M56 and the starting bar M90 are locked against movement when the switch is in the "off" position. When the switch is turned to the "on" position, the arm X passes from beneath the extension or arm Z and hence the locking action on the starting bar is released. This interlock between the switch and the starting bar insures against damage to the machine which might occur if the interlock were not provided and the starting bar be depressed when the switch was in the off position, the machine not making its stroke until the current was turned on, in the interval the parts of the calculating machine being subject to displacement.

Having thus described my invention, what I claim as new and desire to secure by Letters Patent, is:—

1. In a calculating machine having a movable carriage, the combination with a normally locked motor drive therefor, of numeral keys for said calculating machine, operating keys for said calculating machine, and an interlock controlled by the operating keys and by the carriage adapted to prevent operation of the motor drive controlling device except on the depression of one of said operating keys or when the carriage is in tabulating position.

2. In a calculating machine, numeral keys, operating keys controlling the functions of the machine, a motor drive for the machine, a starting bar, rockers respectively pivotally connected to the starting bar and pivotally connected together, and a latch for locking one of the rockers to prevent depression of the starting bar, said latch being controlled by the operating keys and released from the rocker when any one of said keys is depressed.

3. In a calculating machine having a movable carriage, the combination with a motor drive for said machine, of a starting bar, rockers pivoted together and respectively pivotally connected to different parts of the starting bar, a latch adapted to lock one of the rockers and prevent depression of the starting bar, means coöperating with the latch and with the carriage, whereby the latch is normally released from the rocker but is caused to engage therewith and to lock it and the starting bar when the carriage has passed beyond printing position.

4. In a calculating machine, the combination with a correction key, of a starting bar, a spring-actuated locking member for the correction key, and means operated by the starting bar adapted to hold the locking device out of engagement with the correction key when the starting bar is in normal position but which releases the locking device to thereby lock the correction key when the starting bar is depressed.

5. In a motor driven calculating machine, the combination with a starting bar, of a correction key, a spring-actuated locking member for the starting bar and means operated by the correction key adapted to hold the locking device out of engagement with the starting bar when the correction key is in normal position but which releases the locking device to thereby lock the starting bar when the correction key is depressed.

6. In a motor driven calculating machine, the combination with a correction key, of a starting device, spring-actuated locking members for the correction key and the starting bar, and means operated by the starting bar and correction key adapted to hold the locking devices out of engagement when the parts are in normal position but which release one of the locking devices to thereby lock either the starting bar or the correction key when the other is depressed.

7. In a calculating machine having a movable carriage, numeral keys, operating keys controlling the functions of the machine, a motor drive for the machine, a starting bar, rockers, respectively pivotally connected to the starting bar and pivotally connected together, and a latch for locking one of the rockers to prevent depression of the starting bar, said latch being controlled by the operating keys and by the carriage and released from the rocker when any one of said operating keys is depressed or when the carriage is in tabulating position.

8. In a motor drive for calculating machines, the combination with the motor shaft and the calculating machine, of a clutch connecting with the motor shaft, operating means interposed between the motor shaft and the calculating machine for driving the latter, a manually operated starting device and a device movable with the operating means for disengaging the clutch.

In testimony whereof, I hereunto affix my signature in presence of two witnesses.

NATHAN W. PERKINS, JR.

Witnesses:
 CHAS. N. MCFARLAND,
 CHAS. D. WOOLSEY.

Copies of this patent may be obtained for five cents each, by addressing the "Commissioner of Patents, Washington, D. C."